United States Patent
Lin et al.

(10) Patent No.: US 11,954,441 B2
(45) Date of Patent: Apr. 9, 2024

(54) DEVICE AND METHOD FOR GENERATING ARTICLE MARKUP INFORMATION

(71) Applicant: Acer Incorporated, New Taipei (TW)

(72) Inventors: Yi-Chun Lin, New Taipei (TW); Yueh-Yarng Tsai, New Taipei (TW); Pin-Cyuan Lin, New Taipei (TW); Ke-Han Pan, New Taipei (TW); Sheng-Wei Chu, New Taipei (TW)

(73) Assignee: Acer Incorporated, New Taipei (TW)

( * ) Notice: Subject to any disclaimer, the term of this patent is extended or adjusted under 35 U.S.C. 154(b) by 331 days.

(21) Appl. No.: 17/568,687

(22) Filed: Jan. 4, 2022

(65) Prior Publication Data

US 2023/0153535 A1 May 18, 2023

(30) Foreign Application Priority Data

Nov. 16, 2021 (TW) .................. 110142549

(51) Int. Cl.
*G06F 40/295* (2020.01)
*G06N 3/08* (2023.01)

(52) U.S. Cl.
CPC ............ *G06F 40/295* (2020.01); *G06N 3/08* (2013.01)

(58) Field of Classification Search
CPC ................... G06F 40/295; G06N 3/08
USPC .......................... 704/231, 232, 251
See application file for complete search history.

(56) References Cited

U.S. PATENT DOCUMENTS

2016/0336008 A1\* 11/2016 Menezes ............... G06F 40/295

FOREIGN PATENT DOCUMENTS

| CN | 105095444 | 11/2015 |
|---|---|---|
| CN | 107111608 | 8/2017 |
| CN | 110688491 | 1/2020 |
| CN | 111159416 | 5/2020 |
| TW | 201117024 | 5/2011 |
| TW | 201931170 | 8/2019 |
| TW | 202129533 | 8/2021 |

\* cited by examiner

Primary Examiner — George C Monikang
(74) Attorney, Agent, or Firm — JCIPRNET

(57) ABSTRACT

A device and method for generating article markup information are provided. The method for generating article markup information includes the following. Segmentation processing is performed on an article to generate a segmentation result. Name entity recognition is performed on the segmentation result to generate a first recognition result. Whether the segmentation result includes any word in an expansion list is determined. Expanded entity classification conversion is performed on the first recognition result to generate a second recognition result. The second recognition result and the segmentation result are used as markup information.

11 Claims, 3 Drawing Sheets

DEVICE AND METHOD FOR GENERATING ARTICLE MARKUP INFORMATION

CROSS-REFERENCE TO RELATED APPLICATION

This application claims the priority benefit of Taiwan application serial no. 110142549, filed on Nov. 16, 2021. The entirety of the above-mentioned patent application is hereby incorporated by reference herein and made a part of this specification.

BACKGROUND

Technical Field

The disclosure relates to a device and method for generating article markup information, and in particular to a device and method for generating article markup information that automatically generate markup information.

Description of Related Art

In establishing artificial intelligence, machine learning models, and deep learning models, training information is one of the important elements. Each piece of training information used for supervised learning needs to have a corresponding answer markup.

In a current technology, pieces of information are manually marked up one by one, which is time-consuming and prone to markup errors, and in turn leads to poor performance of subsequent model training or errors during training. Therefore, there is still room for improvement in generating markup information for training models.

SUMMARY

The disclosure provides a device and method for generating article markup information, which generate a word in a markup article according to a preset word and an entity classification, thereby automatically generating markup information used to train a model.

A device for generating article markup information of the disclosure includes a processor and a transceiver. The processor is coupled to the transceiver, and the processor is used to: perform segmentation processing on an article to generate a segmentation result; perform named entity recognition on the segmentation result according to a named entity recognition model to generate a first recognition result; according to an expansion list, determine whether the segmentation result includes any word among multiple words in the expansion list; when the segmentation result includes any one of the words in the expansion list, perform expanded entity classification conversion on the first recognition result according to the expansion list and the segmentation result to generate a second recognition result; and use the second recognition result and the segmentation result as markup information, and output the markup information.

A method for generating article markup information of the disclosure includes the following. Segmentation processing is performed on an article to generate a segmentation result. Named entity recognition is performed on the segmentation result according to a named entity recognition model to generate a first recognition result. According to an expansion list, whether the segmentation result includes any word among multiple words in the expansion list is determined. When the segmentation result includes any one of the words in the expansion list, expanded entity classification conversion is performed on the first recognition result according to the expansion list and the segmentation result to generate a second recognition result. The second recognition result and the segmentation result are used as markup information, and the markup information is output.

Based on the above, the article markup generating device of the disclosure automatically generates article markup information with entity classification related to the expansion list. In addition, the markup information is used as training information for the named entity recognition model.

DESCRIPTION OF THE EMBODIMENTS

Figure 1:
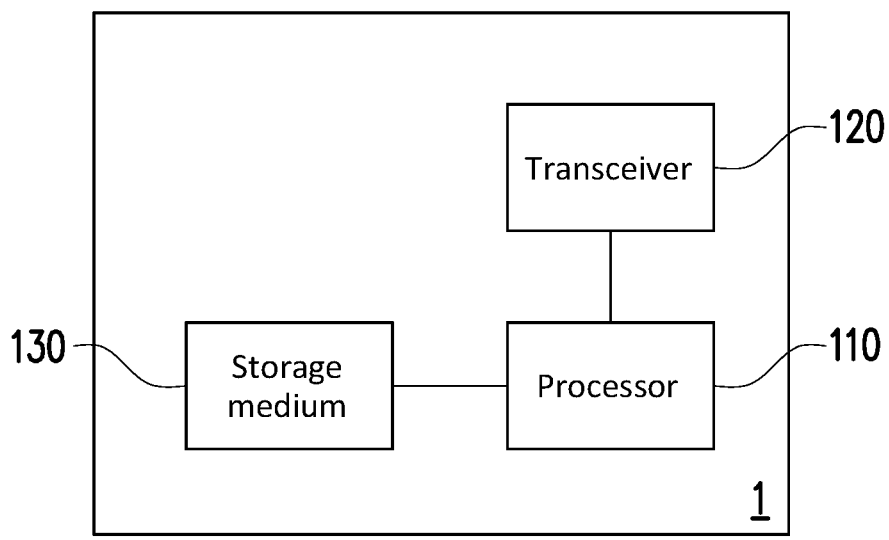
FIG. 1 illustrates a schematic diagram of a device for generating article markup information according to an embodiment of the disclosure.

To provide a further understanding of the content of the disclosure, embodiments as examples of how this disclosure may be implemented are described below. In addition, wherever possible, elements/components/steps with the same reference numeral in the drawings and embodiments represent the same or similar components.

FIG. 1 illustrates a schematic diagram of a device for generating article markup information according to an embodiment of the disclosure. A device for generating article markup information 1 may include a processor 110 and a transceiver 120. The device for generating article markup information 1 may be used to automatically generate markup information for expanding training samples of a named entity recognition model, thereby strengthening and expanding the recognition range and efficacy of the named entity recognition model.

The processor 110 is, for example, a central processing unit (CPU), or other programmable general-purpose or special-purpose elements, such as a micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements or a combination of the above elements. The processor 110 may be coupled to the transceiver 120.

The transceiver 120 transmits and receives signals in a wireless or wired manner. The transceiver 120 may further perform operations such as low noise amplification, impedance matching, frequency mixing, up or down frequency conversion, filtering, amplification, and the like.

Figure 2:
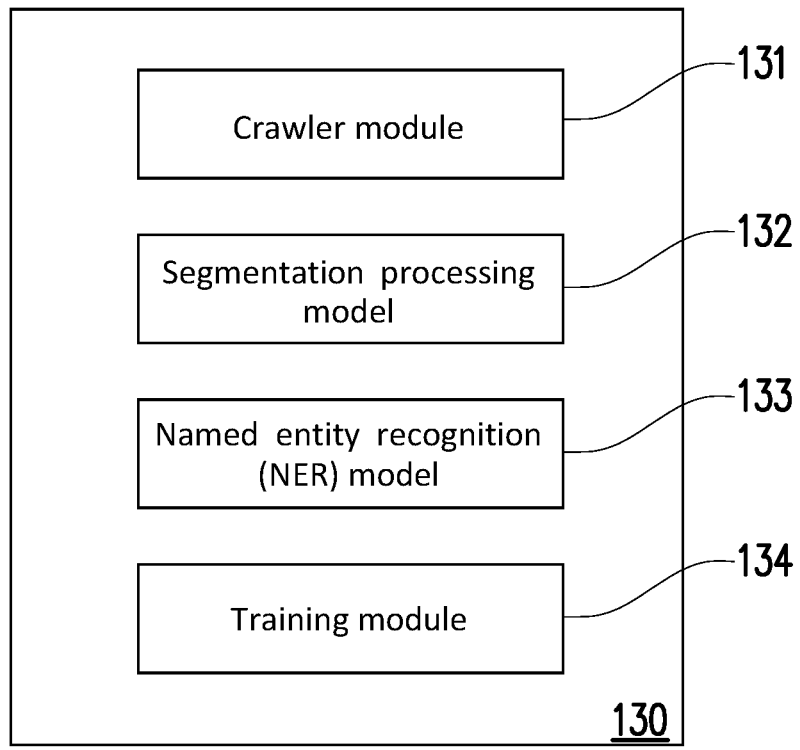
FIG. 2 illustrates a schematic diagram of a storage medium according to an embodiment of the disclosure.

In another embodiment, the device for generating 1 may further include a storage medium 130, and the storage medium 130 is coupled to the processor 110. The storage medium 130 is, for example, any type of fixed or removable random access memory (RAM), read-only memory (ROM), flash memory, hard disk drive (HDD), solid state drive (SSD), or similar element or a combination of the above elements. The storage medium 130 is used to store a plurality of modules or various applications that may be executed by the processor 110. In this embodiment as shown in FIG. 2, the storage medium 130 may store a plurality of modules including a crawler module 131, a segmentation processing model 132, a named entity recognition (NER) model 133, and a training module 134, and functions thereof will be explained later. The processor 110 accesses and executes a plurality of modules and various applications stored in storage medium 130.

Hereinafter, each device, element, and/or module in the device for generating article markup information 1 will be used to describe the method described in the embodiment of the disclosure. Each process of this method may be adjusted according to the implementation situation, and is not limited thereto.

Figure 3:
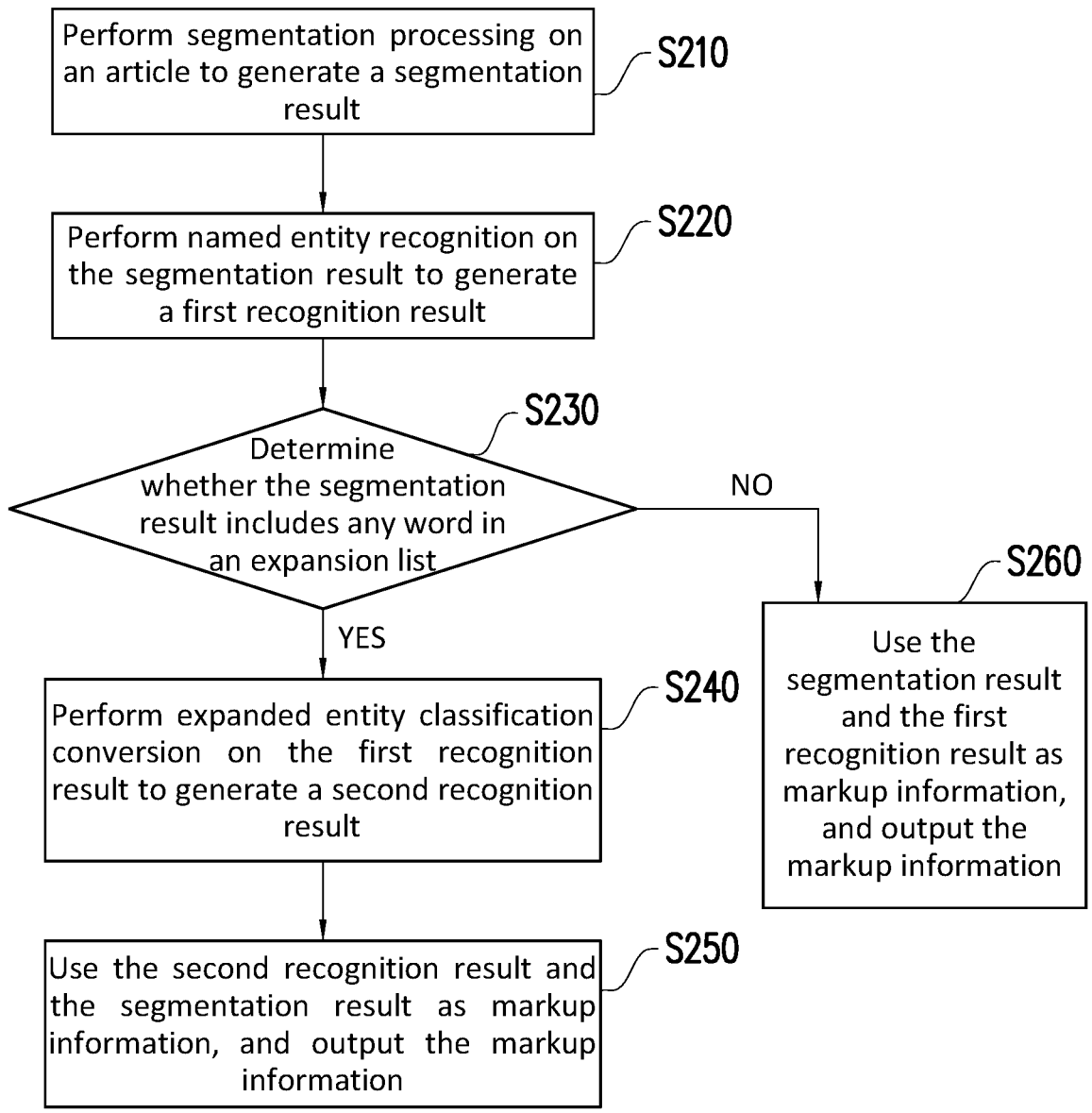
FIG. 3 illustrates a flow chart of a method for generating article markup information according to an embodiment of the disclosure.

FIG. 3 illustrates a flow chart of a method for generating article markup information according to an embodiment of the disclosure, and the method for generating article markup information may be implemented by the device for generating article markup information 1 shown in FIG. 1. In this embodiment, the processor 110 performs segmentation processing on an article to generate a segmentation result (step S210). In an embodiment, the processor 110 obtains a plurality of articles through crawler technology according to a crawler module. For example, the crawler module may access news websites or medical websites through the transceiver 120, and use crawler technology to obtain a plurality of pieces of news and articles from the news websites or medical websites. In another embodiment, the crawler module may repeatedly store articles into the storage medium 130 according to a preset cycle.

In an embodiment, the processor 110 performs segmentation processing on an article to be marked up (that is, article) through the segmentation processing model 132. For example, the segmentation processing model 132 described in the disclosure may be executed by a Tokenizer of a bidirectional encoder representations from transformers (BERT) algorithm, but this application is not limited thereto. For example, the article to be marked up is "John believes that only around 20% of the country's 126 million population has been fully vaccinated against Covid-19.". The processor 110 performs segmentation processing on the article to be marked up to derive a segmentation result corresponding to the article to be marked up. In this embodiment, the segmentation result is "John,believes,that,only, around,2,%,of,the,country,',s,126,million,population,has, been,fully,vaccinated,against, Covid,-,19,.". It may be seen from the above that the segmentation processing used in this embodiment is segmentation processing in which both punctuation marks and words are segmented, but this application is not limited thereto.

In an embodiment, after the processor 110 derives the segmentation result, the processor 110 performs named entity recognition on the segmentation result according to the named entity recognition model 133 to generate a first recognition result (step S220). Specifically, the processor 110 performs named entity recognition on the segmentation result through the named entity recognition model 133. In another embodiment, step S210 and step S220 may be integrated into one step; that is, after the processor 110 performs named entity recognition on the article according to the named entity recognition model 133, the segmentation result and the first recognition result corresponding to the segmentation result may be derived.

For example, the named entity recognition model 133 is trained based on deep learning including a natural language processing algorithm based on a Transformer architecture. For example, the named entity recognition model 133 may be trained by the bidirectional encoder representations from transformers (BERT) algorithm, the ELMo algorithm, or the GPT-2 algorithm. Through the named entity recognition model 133, the processor 110 marks the words in the segmentation result that are also in the named entity recognition model 133 as corresponding entity classifications. For example, after the processor 110 performs named entity recognition on the aforementioned segmentation result according to the named entity recognition model 133, the processor 110 may derive the corresponding first recognition result. The first recognition result is "B-PER,O,O,O,O,O,O, O,O,O,O,O,O,O,O,O,O,O,O,O,O,O,O,O,O". In this embodiment, B-PER represents a name of a person, and O represents a non-named entity or other, but this application is not limited thereto. The named entity recognition model 133 may generate an entity classification corresponding to a word. For example, the named entity recognition model 126 may classify a word into any one of entity classifications including "name of a person", "name of a place", "name of an organization", "time", "number", "other entity" or "other".

After the processor 110 derives the first recognition result, in an embodiment, the processor 110 determines whether the segmentation result includes any word in an expansion list according to the expansion list (step S230). In an embodiment, a plurality of words in this expansion list are words that have undergone segmentation processing and/or format unification processing, and the format unification processing may be uniformly converting the letters in each word to uppercase, or uniformly converting the letters in each word to lowercase. In addition, the expansion list is a word list preset by the user.

For example, this expansion list is a word list of infectious diseases preset by the user, and the entity classification of the words is DIS. An example is shown in Table (1):

TABLE 1

| Word | Synonym | Synonym | Synonym | Synonym |
| --- | --- | --- | --- | --- |
| Covid-19 | Wuhan pneumonia | SARS-CoV-2 | Corona virus 2019 | Coronavirus pandemic |
| Dengue fever | dengue virus | dengue | DEN-1 | NS1 rapid test |
| ZIKA | ZIKV | Zika virus | Zika virus infection | Microcephaly |
| novel influenza | avian flu | Novel Influenza A Virus Infections | Pandemic influenza | H5N1 |

From the example of the expansion list (that is, Table (1)), it may be known that the expansion list includes words and synonyms. The user may set and expand the words and synonyms in this expansion list; for example, the user may add an expansion list related to book titles, an expansion list related to legal terms, or an expansion list related to other proper nouns. In addition, in step S230, the processor 110 improves the accuracy of its determination by using the words and synonyms included in the expansion list. For example, when dengue is represented as "DEN-1", "Dengue fever", or other ways to represent dengue in the article (that is, the article to be marked up), or when West Nile Fever is represented as "West Nile virus", "WNV" and other ways to represent West Nile Fever in the article, the processor 110 may determine whether the segmentation result includes any word or any synonym in the expansion list according to the words and the corresponding synonyms in the expansion list, so as to achieve high accuracy. Synonymous words in the expansion list may also be used to unify a disease name (or entity classification). For example, dengue fever in the article may be marked as an entity classification of DIS or a name of Dengue, but the disclosure is not limited thereto.

In other words, in step S230, the processor 110 may determine whether the words in the expansion list match any word in the segmentation result (that is, the article after segmentation processing). If a word in the expansion list matches a word in the article after segmentation, step S240 is proceeded to. If a word in the expansion list does not match a word in the article after segmentation, step S260 is proceeded to. For example, if the word "(dengue, fever)" is included in the segmentation result, the processor 110 may determine that the segmentation result matches the word of an extended article based on the segmentation result of the words in the expansion list (see Table (1)) including the word "(dengue, fever)". If the segmentation result does not include the word segmentation of any word in the expansion list, the processor 110 determines that the segmentation result does not match the words in the expansion list.

In an embodiment, when the segmentation result (that is, the article after segmentation processing) includes any word/ the segmentation result of any word in the expansion list, the processor 110 performs expanded entity classification conversion on the first recognition result according to the expansion list and the segmentation result to generate a second recognition result (step S240). In the expanded entity classification conversion, the processor 110 converts the corresponding entity classification in the first recognition result into the corresponding entity classification in the expansion list based on the letters (that is, a single word or a phrase) in the segmentation result matching with (that is, being the same as) a word of the expansion list/the segmentation result of a word. For example, the segmentation result is "John,believes,that,only,around,2,%,of,the,country,',s, 126,million,population,has,been,fully,vaccinated,against, Covid,-,19,.", and the first recognition result is "B-PER,O, O,O,O,O,O,O,O,O,O,O,O,O,O,O,O,O,O,O,O,O,O", and the segmentation result of the words in the expansion list (as shown in Table (1)) includes "Covid,-,19". The processor 110 converts the original entity classification "O,O,O" corresponding to "Covid,-,19" in the first recognition result into "B-DIS,I-DIS,I-DIS" according to "Covid,-,19" in the segmentation result to derive the second recognition result. In this embodiment, the second recognition result is "B-PER, O,O,O,O,O,O,O,O,O,O,O,O,O,O,O,O,O,O,O, B-DIS,I-DIS,I-DIS,O". It should be noted that the punctuation marks in the article after segmentation processing are separated one by one.

In an embodiment, after the processor 110 derives the second recognition result, the processor 110 uses the second recognition result and the segmentation result as markup information, and outputs the markup information (step S250).

In an embodiment, when the segmentation result does not include any word in the expansion list/the segmentation result of any word, the processor 110 uses the segmentation result and the first recognition result as markup information, and the processor 110 outputs the markup information (step S260). In the disclosure, the processor 110 uses the markup information as training information and verification information to train the named entity recognition model. In another embodiment, the processor 110 writes the markup information into a corresponding file type (for example, csv, xml, json, or txt) according to the markup information format and file type corresponding to different named entity recognition models. In this way, through the device and method for generating of the disclosure, automatic markup of a large amount of information may be performed accurately, thereby automatically generating markup information that may be used to train the model, saving labor costs, and improving the performance of the model. It is worth noting that the device for generating article markup information 1 and the method for generating article markup information in the disclosure may also be applied to other situations that require file re-markup. This application should not be limited to training models only.

In another embodiment, in step S230, the processor 110 performs searching processing on the segmentation result based on the segmentation result of each word in the expansion list and a plurality of window lengths of the segmentation results of the corresponding words to improve the accuracy of text recognition and reduce the incidence of errors to determine whether the segmentation result includes any word. Specifically, an arithmetic module 122 may determine whether a word in the segmentation result is one of the segmentation results of a plurality of words in the expansion list, and the determination process includes comparing the window dimensions (that is, window lengths) of the segmentation results of the words in the expansion list. The segmentation result of each word has a corresponding window dimension. For example, the segmentation result of the word "Covid-19" is (Covid,-,19), and the window dimension is 3 (that is, the search length is 3); the segmentation result of the word "Dengue" is (Dengue), and the window dimension is 1 (that is, the search length is 1); the segmentation result of the word "SARS-CoV2" is (SARS,-, CoV2), and the window dimension is 3 (that is, the search length is 3). Taking the word "Covid-19" as an example, in step S230, the processor 110 performs word-by-word searching on the segmentation results of the article based on the search length being 3 and the segmentation result of the word being (Covid,-,19).

Figure 4:
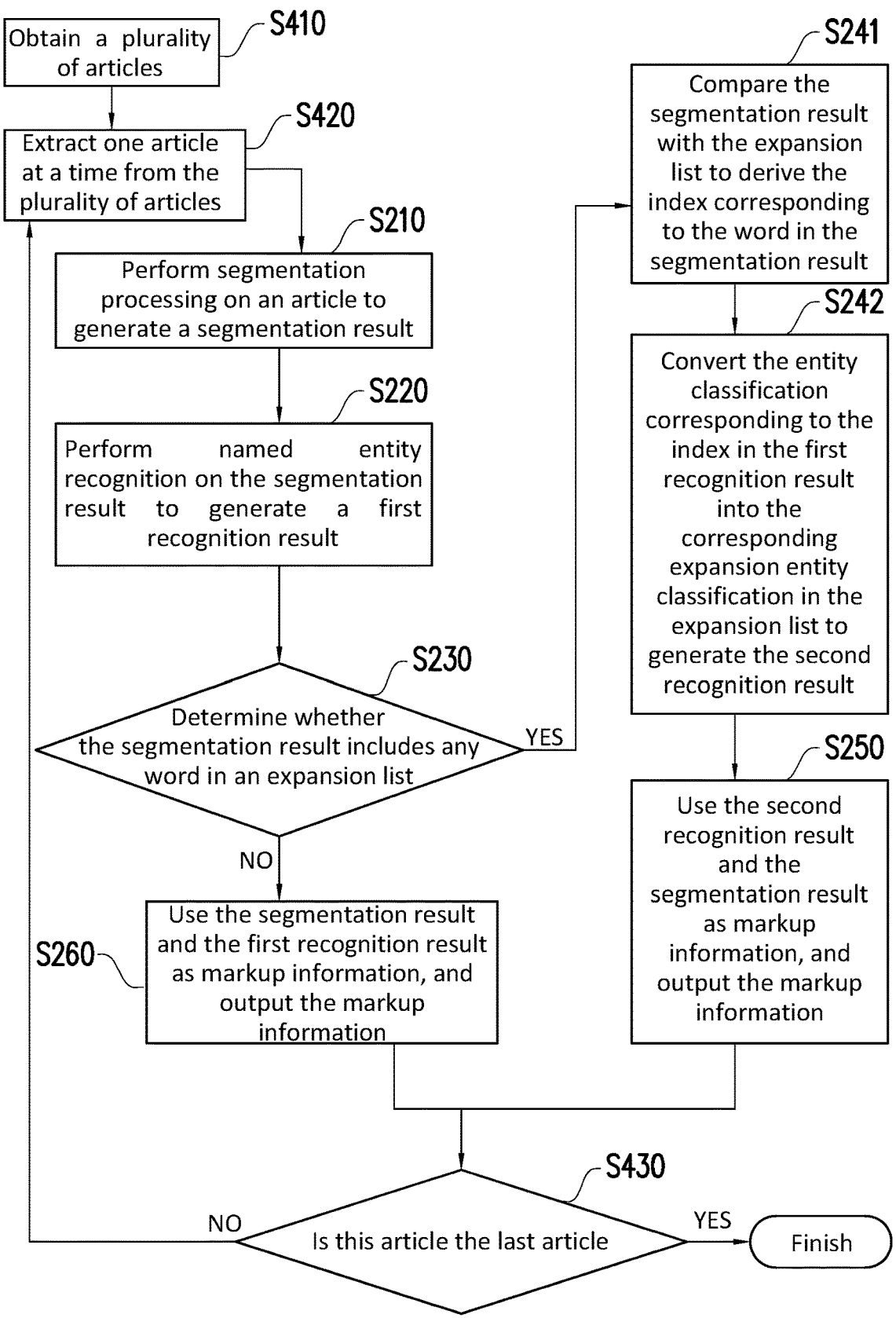
FIG. 4 illustrates a flow chart of a method for generating article markup information according to another embodiment of the disclosure.

FIG. 4 illustrates a flow chart of a method for generating article markup information according to another embodiment of the disclosure. As shown in FIG. 4, step S240 further includes the following. According to the expansion list and the first recognition result, the processor 110 compares the segmentation result with the segmentation result of the words in the expansion list to derive a plurality of indexes corresponding to at least one word in the segmentation result (step S241). According to the indexes and the preset entity classifications of the expansion list, the processor 110 converts the entity classifications corresponding to these indexes in the first recognition result into the preset entity classifications of the expansion list to generate the second recognition result (step S242). For example, the segmentation result is "John,believes,that,only,around,2,%,of,the, country,',s,126,million,population,has,been,fully,vacci- nated,against,Covid,-,19,.", the first recognition result is "B-PER,O,O,O,O,O,O,O,O,O,O,O,O,O,O,O,O,O,O,O, O,O", and the expansion list is shown in Table (1). After comparison, the processor 110 derives the 21st, 22nd, and 23rd words in the segmentation result corresponding to the word "Covid-19" in expansion list. Next, the processor 110 converts the 21st, 22nd, and 23rd entity classifications "O, O, O" in the first recognition result into the entity classifications of "B-DIS, I-DIS, I-DIS". Accordingly, the second recognition result is "B-PER,O,O,O,O,O,O,O,O,O,O,O, O,O,O,O,O,O,O,O, B-DIS,I-DIS,I-DIS,O". Accordingly, the disclosure marks the entity classification of the first single word of the corresponding word as "B-entity classification name", and marks the other single words of the corresponding word as "I-entity classification name", and the entity classification name is DIS, but the disclosure is not limited thereto. In another embodiment, if the corresponding word is a single word, for example "dengue", the first recognition result is "O" and the second recognition result is "B-DIS". In other words, the I-entity classification name only appears in corresponding words with more than one single word. When the article includes a plurality of disease names, the method for generating article markup information of the disclosure is used to correct the entity classifications of all disease names in the article. In other words, the disclosure scans article to be marked up for the words and synonyms thereof in the expansion list. If the article to be marked up has a plurality of diseases (that is, corresponding to the words of the expansion list), for example, disease A, disease B, disease C, and disease A, disease B, and disease C may be the same disease name or be synonymous with each other or be different disease names, the device for generating 1 and the method for generating of the disclosure sequentially remember the indexes of disease A, disease B, and disease C in the article to be marked up and the corresponding segmentation result. Accordingly, the disclosure converts the entity classifications corresponding to the indexes of disease A, disease B, and disease C in the recognition result into the entity classifications in the expansion list (for example, DIS). For example, the article to be marked up is "Brazil study: People who have had dengue in the past are twice as likely to develop symptoms of COVID-19 if infected.". The segmentation result of this article to be marked up is "Brazil,study,:,People,who,have,had,dengue, in,the,past,are,twice,as,likely,to,develop,symptoms, of,COVID,-,19,if,infected,.". In addition, the first recognition result of this segmentation result is "B-LOC,O,O,O,O, O,O,O,O,O,O,O,O,O,O,O,O,O,O,O,O,O,O,O", and the second recognition result is "B-LOC,O,O,O,O,O,O,B-DIS, O,O,O,O,O,O,O,O,O,O,O,B-DIS,I-DIS,I-DIS,O,O,O". In this way, in the article marked up by the device for generating 1 of the disclosure, it may be ensured that every corresponding word has been marked up, and a situation of a modifying the named entity classification of disease name A while not modifying the named entity of disease name B does not occur, thereby improving the accuracy of article markup. In other words, in step S241 of the disclosure, the processor 110 records the words in the article corresponding to the words in the expansion list, and records the indexes of the words in the segmentation result. Furthermore, the processor 110 converts the entity classification in the first recognition result to the corresponding entity classification in the expansion list according to these indexes, thereby improving the accuracy of the conversion of the entity classification.

In the disclosure, by marking the entity classification of the first word among a plurality of words as B-DIS or B-BOOK, and marking the entity classification of the other words as I-DIS or I-BOOK, the clarity between the entity classifications is increase, thereby improving the convenience of subsequent use (for example, using the recognition result as training information and verification information for training a model). It is worth noting that the preset entity classifications of the expansion list may be entity classifications such as "car brand" and "disease name", and may include corresponding words.

In an embodiment, in step S210, the processor 110 performs segmentation processing and format conversion on an article to generate a segmentation result. The format conversion is converting every uppercase letter in the article to the corresponding lowercase letter. It is easy to understand that the processor may also convert every letter in the article into an uppercase letter through format conversion. This application is not limited thereto. The processor 110 improves the accuracy and correct rate of the processor 110 in recognizing letters by converting the letter format in the article to a same format (uniformly uppercase or lowercase). Specifically, in this embodiment, the processor 110 performs segmentation processing on the article to generate a segmentation result without format conversion, and the processor 110 performs segmentation processing and format conversion on the article to generate a segmentation result. Next, in step S220, step S230, and step S240, the segmentation results used by the processor 110 have all been subjected to format conversion and segmentation processing. It is worth noting that in step S250 and step S260, the segmentation result used as markup information have not been subjected to format conversion. In other words, the letter format in the segmentation result used as markup information is consistent with the letter format (for example, uppercase or lowercase) in the unprocessed article, thereby improving compatibility of output information (that is, markup information) of the disclosure.

FIG. 4 illustrates a flow chart of a method for generating article markup information according to another embodiment of the disclosure. In an embodiment, the processor 110 obtains a plurality of articles (step S410). In the disclosure, the processor 110 may obtain a plurality of articles through the crawler module 131 by using crawler technology. For example, the crawler module 131 may access news websites through the transceiver 120, and use crawler technology to obtain a plurality of news articles from the news websites. In an embodiment, the crawler module 121 may repeatedly execute step S410 according to a preset cycle and a set value.

In an embodiment, after obtaining a plurality of articles, the processor 110 extracts one article at a time from the plurality of articles (step S420). On the other hand, after step S260 and step S250, the processor 110 determines whether this article is the last article among the plurality of articles (step S430). If the article is the last article, the process ends, if the article is not the last article, step S420 is returned to.

In summary, the disclosure may go beyond the limitations of an existing named entity recognition model and automatically expand and generate training information, and the training information may be used to train a named entity recognition model. In this way, the article markup information generated by the device for generating of the disclosure may be used to expand the recognition range of the named entity recognition model. In the process of converting the entity classifications, by recording the indexes of the corresponding words in the segmentation result, the entity classifications of the corresponding words are converted one by one, thereby improving the correct rate of converting entity classifications. On the other hand, by converting the letters in the markup article and the expansion list to the same format (uniformly uppercase or lowercase), accuracy of text recognition is improved and incidence of errors is reduced.

What is claimed is:

1. A device for generating article markup information, comprising:
   a transceiver; and
   a processor, coupled to the transceiver, used to:
   perform segmentation processing on an article to generate a segmentation result;

perform named entity recognition on the segmentation result according to a named entity recognition model to generate a first recognition result;

according to an expansion list, determine whether the segmentation result comprises any word among a plurality of words in the expansion list;

when the segmentation result comprises any one of the words in the expansion list, perform expanded entity classification conversion on the first recognition result according to the expansion list and the segmentation result to generate a second recognition result; and use the second recognition result and the segmentation result as markup information, and output the markup information.

2. The device for generating article markup information according to claim 1, wherein in the step of performing segmentation processing on the article to generate the segmentation result, the processor is further used to:

perform segmentation processing and format conversion on the article to generate the segmentation result, wherein the format conversion is converting each letter in uppercase in the article into a corresponding letter in lowercase;

wherein the segmentation result used as the markup information has not been subjected to the format conversion.

3. The device for generating article markup information according to claim 1, wherein when the segmentation result does not comprise any one of the words in the expansion list, the processor uses the segmentation result and the first recognition result as the markup information, and the processor outputs the markup information.

4. The device for generating article markup information according to claim 1, wherein the segmentation processing is performed by a segmentation processing model, and the segmentation processing model and the named entity recognition model are respectively trained based on deep learning, and the deep learning comprises a natural language processing algorithm based on a Transformer architecture.

5. The device for generating article markup information according to claim 1, wherein in the step of determining whether any one of the words in the expansion list is comprised in the segmentation result according to the expansion list, the processor is further used to:

according to each of the words in the expansion list and a plurality of window lengths corresponding to the words, perform searching processing on the segmentation result to determine whether the segmentation result comprises any one of the words.

6. The device for generating article markup information according to claim 1, wherein in the step of performing expanded entity classification conversion on the first recognition result to generate the second recognition result, the processor is further used to:

compare the segmentation result with the expansion list according to the expansion list and the first recognition result to derive a plurality of indexes in the segmentation result corresponding to the words;

convert an entity classification in the first recognition result corresponding to the indexes into an expansion entity classification of the expansion list according to the indexes and the expansion list to generate the second recognition result.

7. The device for generating article markup information according to claim 1, wherein the named entity recognition model is based on deep learning, and the deep learning comprises a natural language processing algorithm based on a Transformer architecture and is trained by a preset word list.

8. The device for generating article markup information according to claim 7, wherein the processor is further used to:

train the named entity recognition model according to the markup information to generate an extended named entity model.

9. The device for generating article markup information according to claim 1, wherein the words in the expansion list are words that have undergone segmentation processing and/or format unification processing, wherein the format unification processing is uniformly converting letters in each of the words into uppercase or lowercase letters.

10. A method for generating article markup information, comprising:

performing segmentation processing on an article to generate a segmentation result;

performing named entity recognition on the segmentation result according to a named entity recognition model to generate a first recognition result;

according to an expansion list, determining whether the segmentation result comprises any word among a plurality of words in the expansion list;

when the segmentation result comprises any one of the words in the expansion list, performing expanded entity classification conversion on the first recognition result according to the expansion list and the segmentation result to generate a second recognition result; and using the second recognition result and the segmentation result as markup information, and outputting the markup information.

11. The method for generating article markup information according to claim 10, comprising:

comparing the segmentation result with the expansion list according to the expansion list to derive a plurality of indexes in the segmentation result corresponding to the words; and according to the indexes and the expansion list, converting an entity classification in the first recognition result corresponding to the indexes into an expansion entity classification corresponding to the expansion list to generate the second recognition result.

* * * * *